Patented July 12, 1932

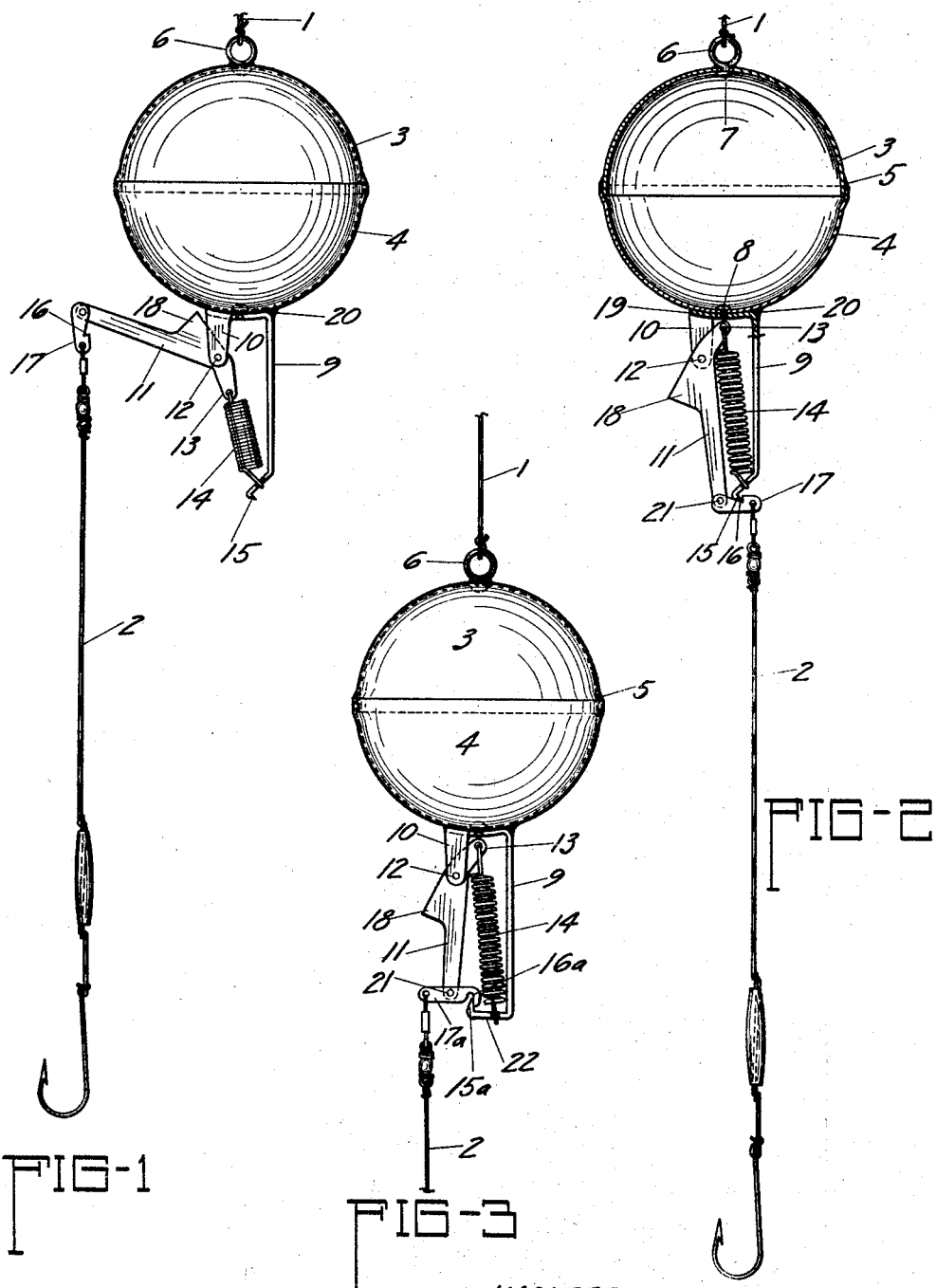

1,866,864

UNITED STATES PATENT OFFICE

WALTER SCHROEDER, OF DAVENPORT, IOWA

FISH LINE BOBBER

Application filed October 5, 1931. Serial No. 566,883.

The present invention relates to an automatically acting fish bobber for use in what is known as still fishing.

Among the objects of this invention are to provide an improved structure of the character indicated; to provide a structure of the character indicated which will be cheaper to manufacture than those heretofore presented to the public and therefore capable of being sold at a lower price; to provide a structure of the character indicated which will, upon being released, give a sufficient action to the fishhook to insure that the fish which trips the device will be hooked; and such further objects, advantages and capabilities as will hereafter appear and as are inherent in the construction disclosed herein. My invention further resides in the combination, construction and arrangement of parts illustrated in the accompanying drawing and, while I have shown therein what is now considered the preferred embodiment of this invention, together with a modification thereof, I desire the same to be understood as illustrative only and not to be interpreted in a limiting sense.

In the drawing annexed hereto and forming a part hereof,

Fig. 1 is an elevation of my improved structure before the same has been set to be put into the water;

Fig. 2 is a similar view, the ball being shown in section, and the mechanism being set and ready to be put into the water;

Fig. 3 is an elevation of a modified form of this construction.

Reference will now be made in greater detail to the annexed drawing in which the main line which is attached to the fish pole is indicated by the numeral 1 and the auxiliary line which connects the fishhook to the bobber, by the numeral 2. The body of the bobber is made up of two hemispheres 3 and 4 which may be connected in any suitable way but I prefer to have one fitting within the other, slightly, and that the two be connected together in water-tight relation as by solder at the joint 5. Before these hemispheres 3 and 4 are joined, a wire is inserted into one of them and then shaped into a loop to form an attachment for the fish line 1. This is shown as having a head on the inside of the bobber body and as being surrounded by solder at the point where it passes through the metal of the bobber. This makes this joint water-tight and there is therefore no possibility of the float becoming water-logged and failing to float when put into the water.

Before the hemispheres are connected together, a screw 8 is passed through a hole in the lower hemisphere and into a screw-threaded opening in the bracket 9. This bracket has a pair of downwardly extending arms 10 between which is pivoted the lever 11, as indicated at 12. The short arm 13 of this lever is connected to the spring 14 which, at its opposite end, is connected to the lower portion of the downwardly extending arm of the bracket 9. If desired, the end of spring 14 may extend through a perforation in the end of this arm or it may be otherwise suitably secured thereto to prevent sliding on the arm, as by forming a notch or notches in the edges of the arm. The extreme end of this arm is bent into a species of hook 15 which engages with a notch 16 in the trigger 17 pivotally connected to the lever 11. The auxiliary line 2 is connected to this trigger 17 and it will therefore be seen by reference to Figure 2 that when a pull is exerted upon the hook the trigger is released from the hook of the bracket 9 and spring 14 causes the lever 11 to be turned about its pivot 12. The spring causes very rapid movement of this lever and therefore a tendency to dent the metal of the bobber unless means is provided to prevent this. In order to assure that this will not happen, I form upon the edge of the lever 11, which is adjacent the hemisphere 4, a projection 18 which engages the part 19 of the the bracket 9. Therefore, this projection or nose 18 will strike the bracket and stop the lever 11 from hitting the ball and causing denting of the metal thereof. Preferably, this ball is made from sheet copper and is therefore not subject to rusting. Also, the screw 8 should be made from a non-rusting metal or else its outer end should be coated with solder, after the screw has been screwed in tightly. After the parts have been fully assembled, a drop of solder is inserted, as indicated at 20, to prevent rotation of the bracket with relation to the ball.

In the structures shown in Figs. 1 and 2, the trigger 17 constitutes a lever of the second class while that shown in Fig. 3 is a lever of the first class. This is denoted by the numeral 17a and is pivoted to the lever 11 at 21 as in the preceding case. In this case, the end of the bracket 9 is bent directly laterally in the arm 22 and then upwardly to form the hook 15a which cooperates with the notch 16a, as in the preceding case.

It will of course be understood that the specific description of structure set forth above may be departed from without departing from the spirit of my invention as set forth in this specification and the appended claims.

Having now disclosed my invention, I claim:

1. A bobber comprising a hollow metallic float, having means at one side thereof for the attachment of a fish line, a bracket at the opposite side of said float, said bracket having an arm extending away from the body of the float and another arm extending in the same general direction as the first arm but spaced therefrom, a lever pivoted on the second mentioned arm, means for attaching a fish line to said lever so that when the lever is turned in one direction about its pivotal connection to the second mentioned arm the fishhook suspending line will be pulled toward the surface of the water.

2. A structure as defined by claim 1 in which resilient means connects the proximate end of the lever to the remote end of the first mentioned arm.

3. In a fish line bobber, a float to which the fish line may be attached, a bracket attached to the opposite side of the float from that to which the fish line is attached, said bracket having a plurality of arms extending away from the float, a lever pivoted between a pair of such arms and carrying upon its remote extremity a trigger to be utilized in latching the lever, another one of the arms, extending farther away from the float than the first mentioned arms, having a hook at its remote extremity, said trigger having a notch therein to cooperate with the hook on the arm, a spring connecting the remote portion of the arm to the lever to cause turning thereof about its pivot, said trigger being provided with means for attaching a fishhook suspending line thereto.

4. A fish line bobber comprising a pair of sheet metal hemispheres secured together at their edges to form a substantially spherical float, said float being provided at one side with means for the attachment of a fish line and at its opposite side with a bracket, said bracket having an arm extending directly away from the float and provided on its remote extremity with a hook, other arms extending from said bracket away from the float and having a lever pivotally connected intermediate its ends between them, a spring connected to the first mentioned arm adjacent its remote end and to the lever adjacent its proximate end whereby to cause turning of said lever about its pivot.

5. A structure as defined by claim 4 in which the lever has pivotally connected to its remote end a trigger having a notch therein to engage the hook on the first mentioned arm and hold the spring in distended position so long as the trigger remains in engagement with the hook on the arm.

6. In a structure for the purpose indicated, a float member having means for attaching a fish line, a bracket secured thereto, an arm projecting from said bracket, away from said float, said arm having a hook at its extremity remote from the float, other arms projecting from said bracket, a lever pivoted to said arms, a spring connecting one end of said lever to said first mentioned arm to cause turning of said lever about its pivot and a trigger carried by said lever and engaging said hook to hold the lever in position for use.

7. In a structure for the purpose indicated, a float having attaching means for a fish line, means projecting from said float for pivotally carrying a lever, a lever pivotally mounted on said means, a spring connected to said lever for causing same to turn about its pivot in one direction, means for latching said lever in a position with the spring under tension, and means for releasing said latching means in response to a pull of a fish upon a fishhook.

In witness whereof, I hereunto subscribe my name to this specification.

WALTER SCHROEDER.